United States Patent

[11] 3,547,340

[72] Inventor Roger L. McDonald
River Rouge, Mich. (2444 Great Highway, San Francisco, CA 94116)
[21] Appl. No. 781,189
[22] Filed Dec. 4, 1968
[45] Patented Dec. 15, 1970

[54] PLASTIC SHEET AND BAG FORMED THEREOF
3 Claims, 2 Drawing Figs.
[52] U.S. Cl...................................................... 229/55,
229/3.5; 161/113
[51] Int. Cl...................................................... B65d 33/00
[50] Field of Search.............................................229/55, 3.5,
Vents; 161/109, 110, 111, 112, 113

[56] References Cited
UNITED STATES PATENTS
| | | | |
|---|---|---|---|
| 2,466,911 | 4/1949 | Raymond...................... | 229/Vents |
| 2,593,328 | 4/1952 | Meaker.......................... | 229/55 |

FOREIGN PATENTS
| | | | |
|---|---|---|---|
| 550,072 | 8/1956 | Belgium....................... | 229/Vents |

Primary Examiner—David M. Bockenek
Attorney—Flehr, Hohbach, Test, Albritton & Herbert ABSTRACT: A plastic sheet which can be used as a cover, separator or wrapping material and a bag including two layers held together in surface to surface contact. Each of the layers is perforated but the perforations of one layer are out of registry with those of the other thereby forming an imperforate double layer which, when separated, forms two separate perforated layers through which air can easily pass.

PATENTED DEC 15 1970　　　　　　　　　　　　3,547,340

INVENTOR.
Roger L. McDonald
BY Flehr, Hohbach, Test,
Albritton & Herbert
Attorneys

PLASTIC SHEET AND BAG FORMED THEREOF

BACKGROUND OF THE INVENTION

In the past, plastic sheets and bags have been found to be extremely dangerous after they are discarded, since children have inadvertently used them as masks and have thereby suffocated themselves. Attempts have been made to overcome the problem by providing the plastic forming the sheet or bag with a series of perforations but such perforations limit the utility of the product prior to its discarding.

SUMMARY OF THE INVENTION AND OBJECTS

The invention is incorporated in a plastic material and a bag formed of two layers of perforate plastic with the perforations being out of registry with each other. The two layers of plastic are held in surface contact with each other either by an adhesive or by their own electrostatic charge. When the material or bag has performed its function, the layers thereof may be separated prior to discarding whereby the multiple perforations in each layer makes the probability of suffocation therewith extremely unlikely.

DESCRIPTION OF THE PREFERRED EMBODIMENT

Figure 1:
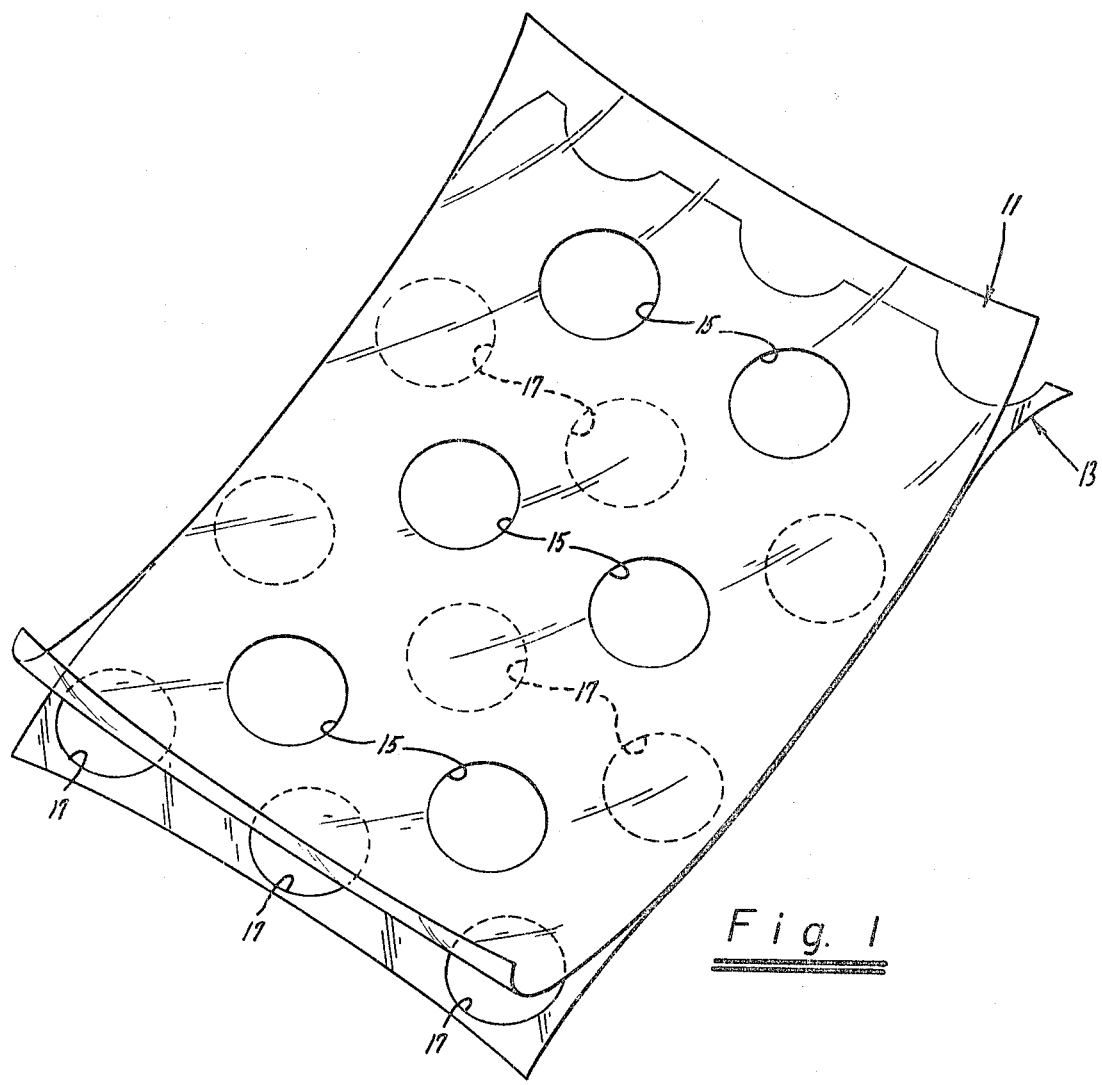
FIG. 1 is a perspective view of the material formed in accordance with this invention.

Referring to FIG. 1, a plastic sheet is formed by first and second layers 11 and 13, respectively, each having perforations 15 and 17 respectively. It is noted that the perforations 15 on the upper layer 11 are out of registry with the perforations 17 on the lower layer 13 whereby, when the two layers are held together in surface contact, a generally imperforate double layer is provided. Such a double layer is imperforate not only to dust and the like but also to air and moisture. Consequently, the double layer may be used to advantage in any of the applications wherein a single imperforate sheet of plastic material may be employed. Such application may include the wrapping of food stuffs and the like where contamination of the product by moisture, air or other foreign substances is extremely undesirable. Another application may be the separation of cargo such as in the hold of a ship.

When, however, the sheet, as shown in FIG. 1 has served its intended utility and is about to be discarded, the layers 11 and 13 may be manually separated. In their separated condition, the multiple perforations of each layer makes it almost impossible for the plastic to cause suffocation even if wrapped tightly about the head of a child.

Figure 2:
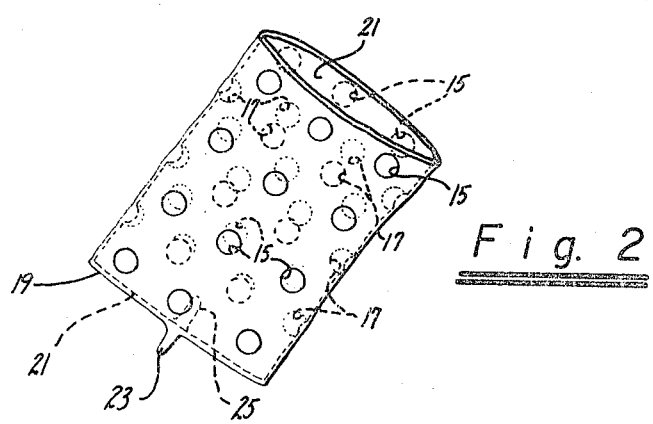
FIG. 2 is a perspective view of a bag constructed in accordance with the invention.

Referring in FIG. 2, there is shown a bag in accordance with the present invention which includes an outer bag member 19 and an inner bag member 21. As in the case of the sheet material, the bag members include perforations 15 and 17 respectively, which are out of registry with each other. In order to assist separation of the inner and outer bag members after use they are provided with tabs 23 and 25, respectively. Upon grasping each of the tabs 23, 25 and pulling them apart the two bag members are separated whereby separate highly perforated bags are formed.

I claim:

1. Plastic sheet material comprising first and second layers of sheet plastic removably disposed in intimate surface to surface contact with each other, both said layers of sheet plastic being perforated, the perforations of the first layer being offset from the perforations of the second layer, said intimate surface to surface contact preventing communication of dust, air and moisture between the perforations of the first layer and the offset perforations of the second layer.

2. A bag including first and second plastic bag members, said first bag member being removably disposed within the second bag member and in intimate surface to surface contact therewith, each of said bag members being perforated, the perforations of the first bag member being offset from the perforations of the second bag member, said intimate surface-to-surface contact preventing communication of dust, air and moisture between perforations of the first bag member and the offset perforations of the second bag member.

3. A bag as defined in claim 2 together with tab means on said first and second bag members for assisting in the separation thereof.